(12) United States Patent
Li et al.

(10) Patent No.: US 8,549,951 B2
(45) Date of Patent: Oct. 8, 2013

(54) JOINT MECHANISM FOR ROBOT

(75) Inventors: Shen-Chun Li, Tu-Cheng (TW);
Hsien-Chuan Liang, Tu-Cheng (TW);
Shou-Kuo Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 330 days.

(21) Appl. No.: 13/012,903

(22) Filed: Jan. 25, 2011

(65) Prior Publication Data

US 2012/0103126 A1 May 3, 2012

(30) Foreign Application Priority Data

Oct. 29, 2010 (TW) .............................. 99137116 A

(51) Int. Cl.
*B25J 17/00* (2006.01)
*B25J 17/02* (2006.01)
*B25J 18/00* (2006.01)

(52) U.S. Cl.
USPC ......................................... 74/490.05; 901/28

(58) Field of Classification Search
USPC ........... 74/490.01–490.06, 89.18, 422, 89.11, 74/89.12, 89.17; 901/15–17, 27–29; 403/92, 93, 96, 103; 384/7, 26
See application file for complete search history.

(56) References Cited

U.S. PATENT DOCUMENTS

| | | | | |
|---|---|---|---|---|
| 4,270,404 A * | 6/1981 | Murakoshi et al. | ........ | 74/490.09 |
| 4,911,033 A * | 3/1990 | Rosheim et al. | ........... | 74/490.03 |
| 4,998,442 A * | 3/1991 | Brown et al. | ................ | 74/89.17 |
| 5,523,662 A * | 6/1996 | Goldenberg et al. | .... | 318/568.11 |
| 5,697,256 A * | 12/1997 | Matteo | ........................ | 74/490.04 |
| 6,871,563 B2 * | 3/2005 | Choset et al. | .............. | 74/490.05 |
| 7,013,750 B1 * | 3/2006 | Kazami | ...................... | 74/490.05 |
| 7,069,695 B2 * | 7/2006 | Hattori et al. | ................... | 49/341 |
| 2009/0173177 A1 * | 7/2009 | Sugawara et al. | ........... | 74/490.03 |
| 2009/0211390 A1 * | 8/2009 | Brogardh et al. | ........... | 74/490.03 |
| 2012/0103126 A1 * | 5/2012 | Li et al. | ...................... | 74/490.05 |

* cited by examiner

*Primary Examiner* — Justin Krause
*Assistant Examiner* — Alexander Vu
(74) *Attorney, Agent, or Firm* — Altis & Wispro Law Group, Inc.

(57) ABSTRACT

A joint mechanism is for a robot. The joint mechanism includes a base; a first drive device mounted on the base including a first drive shaft; a second drive device including a second drive shaft; a joint body defining a plurality of toothed grooves and a guiding groove. A sliding board mounted on first drive shaft, the sliding board slidably located in the guiding groove to guide the joint body to swing relative to the base. A gear mounted on the second drive shaft, the gear meshes with the toothed grooves; a limiting assembly for rotatably mounting the joint body on the base. When the first drive device is started, the first drive shaft is rotated to drive the joint body rotating around the first drive shaft; when the second drive device is started, the second drive shaft is rotated to drive the gear rotating so the joint body swings relative to the base.

18 Claims, 6 Drawing Sheets

JOINT MECHANISM FOR ROBOT

BACKGROUND

1. Technical Field

This disclosure relates to joint mechanisms, in particularly to joint mechanisms for robots.

2. Description of Related Art

A typical robot includes a robot hand, a robot arm and a joint mechanism for joining the robot hand and the robot arm so the robot hand can rotate and swing relative to the robot arm. However, typical robots have a complicated mechanism and are difficult to adjust.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary robot. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
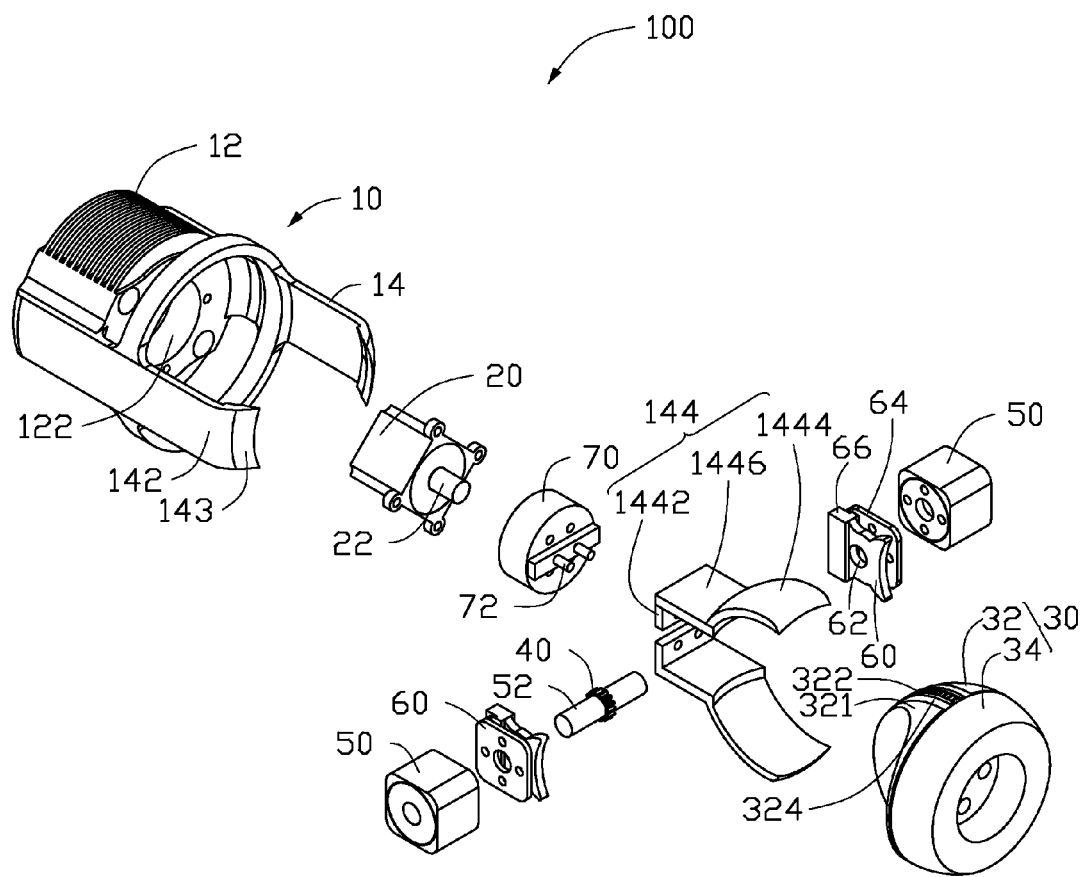
FIG. 1 is an exploded view of an exemplary embodiment of a joint mechanism used with a robot.
Figure 2:
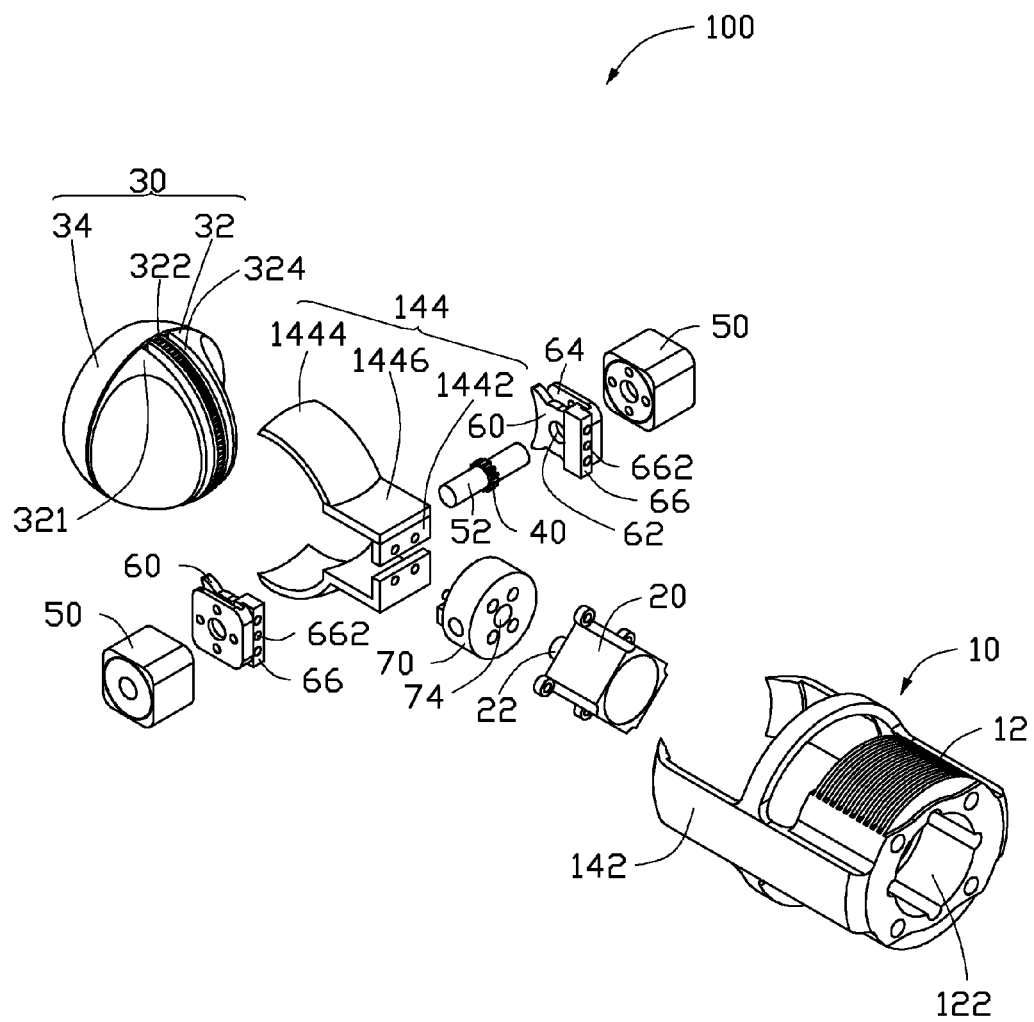
FIG. 2 is another exploded view of the joint mechanism used with a robot in FIG. 1 seen from another aspect.

Referring to FIGS. 1-2, an exemplary embodiment of a joint mechanism 100 for a robot is disclosed. The exemplary embodiment may comprise a joint mechanism 100 is for joining a robot hand of the robot (not shown) to a robot arm of the robot (not shown) so the robot hand can rotate and swing relative to the robot arm. However, the joint mechanism may interconnect any articulated portions of the robot (not shown). The joint mechanism 100 includes a base 10 mounted to a first portion of the robot, a first drive device 20 (e.g., motor) mounted to the base 10, a joint body 30 mounted to a second portion of the robot to be movable with respect to the first portion, a gear 40, two second drive devices 50 (e.g., motors) and two sliding boards 60. The joint mechanism 100 further includes a first drive shaft 22 and a second drive shaft 52. For transferring the power of the first drive device 20, the first drive shaft 22 is mounted to the first drive device 20. For transferring the power of the second drive devices 50, the opposite ends of the second drive shaft 52 are correspondingly mounted to the second drive devices 50. The joint mechanism 100 further includes a connecting element 70, which connects the first drive device 20 to the sliding boards 60.

Figure 3:
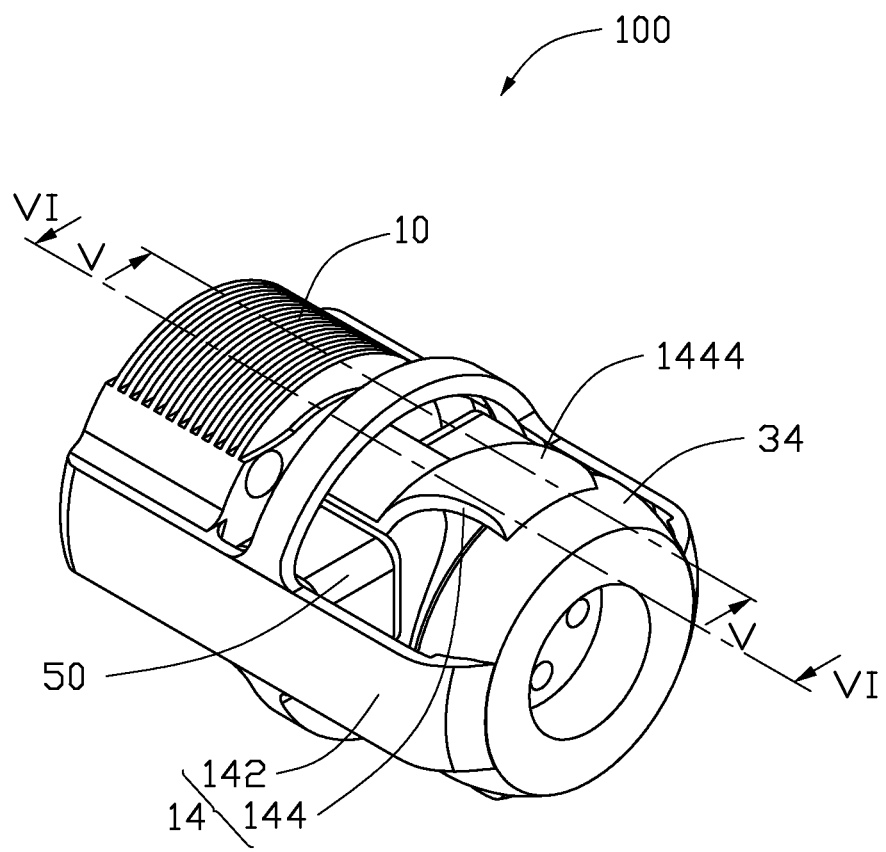
FIG. 3 is an assembled view of the joint mechanism used with a robot shown in FIG. 1.

The base 10 includes a main body 12 and a limiting assembly 14 located on the main body 12. A first end of the base 10 defines a mounting hole 122 for mounting the first drive device 20. The limiting assembly 14 is for rotatably mounting the joint body 30 on the base 10. In this exemplary embodiment, the limiting assembly 14 includes two opposite first limiting arms 142 and two opposite second limiting arms 144. The first limiting arms 142 protrude outwardly from the first end of the base 10. Each limiting arm 142 has a bent portion 143 protruding from a distal end thereof and bending toward the other limiting arm 142. The second limiting arms 144 are releasably mounted at the first end of the base 10. Referring to FIG. 3, both the first limiting arms 142 and the second limiting arms 144 cooperatively define a receiving space (not labeled), in which the joint body 30 is rotatably received. Thus, the joint body 30 is rotatably mounted on the base 10. Each second limiting arm 144 includes a retaining section 1442 retained on the connecting element 70, a connecting section 1446 protruding from a distal end of the retaining section 1442 and a guiding section 1444 protruding from a distal end of the connecting section 1446. The inner surface of each bent portion 143 and the inner face of each guiding section 1444 is a partially spherical surface. The guiding sections 144 are for guiding the joint body 30 to rotate around the second drive shaft 52.

The joint body 30 includes a follower 32 having a partially spherical surface 321 contacting with and complementary to the inner surfaces of the guiding sections 144, and a robot second portion retainer 34 protruding from the follower 32 opposite to the partially spherical surface. The follower 32 defines a plurality of toothed grooves 322 along the partially spherical surface 321, and two guiding grooves 324 respectively located at the two sides of the toothed grooves 322. The toothed grooves 322 mesh with the gear 40 so the gear 40 can drive the joint body 30 to swing relative to the base 10. Each sliding board 60 is slidably accommodated in one of the guiding grooves 324 to guide the joint body 30 to swing relative to the base 10.

The gear 40 is mounted on the second drive shaft 52. Each sliding board 60 defines an opening 62 for one end of the second drive shaft 52 to pass through. Each sliding board 60 further includes a first retaining portion 64 and a second retaining portion 66. The first retaining portions 64 are for retaining the sliding boards 60 on the second drive device 50. Each second retaining portion 66 defines a retaining hole 662; one side of the connecting element 70 includes two retaining pins 72 which engage with the retaining holes 662 so the sliding boards 60 are retained to the connecting element 70. The other side of the connecting element 70 includes a shaft hole 74 for retaining the first drive shaft 22.

Figure 4:
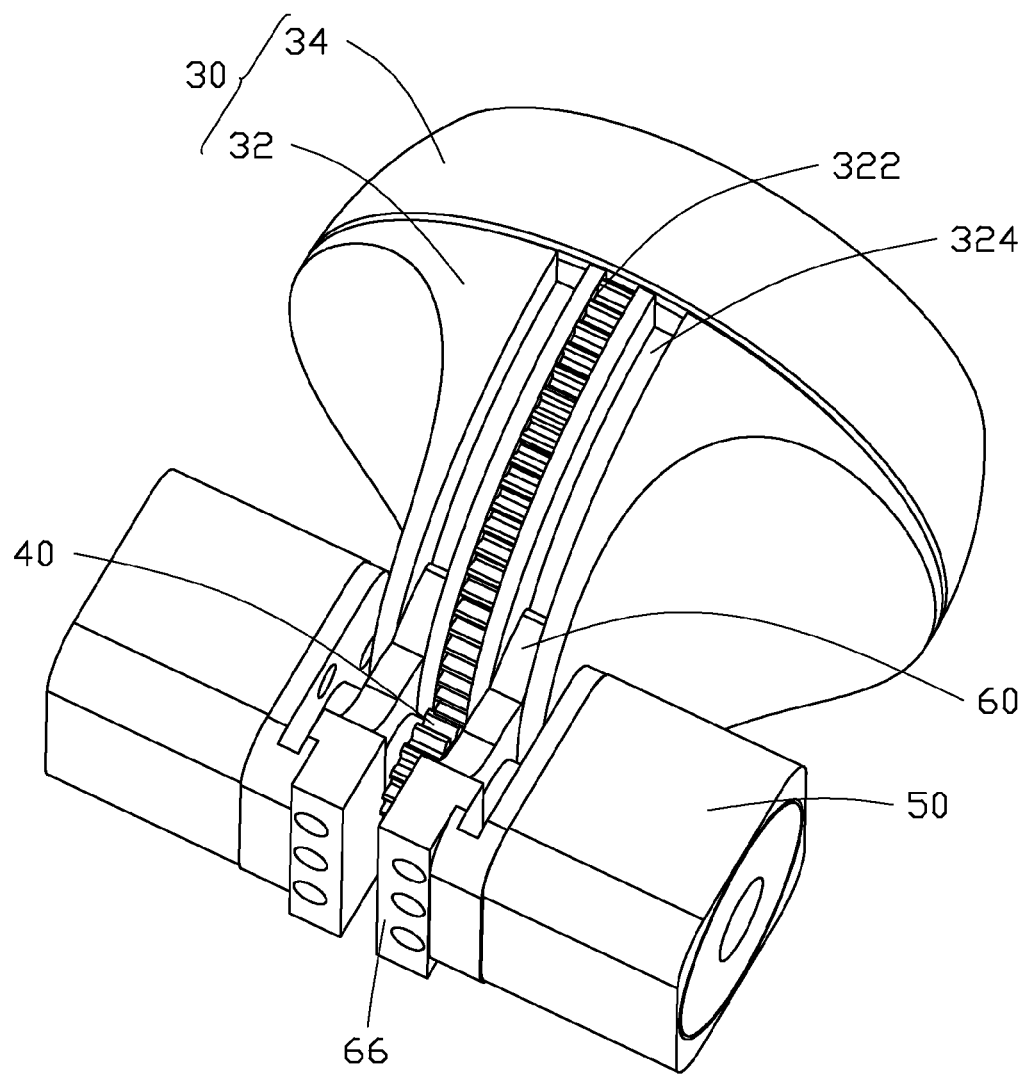
FIG. 4 is a partially assembled view of the joint mechanism used with a robot shown in FIG. 1.
Figure 5:
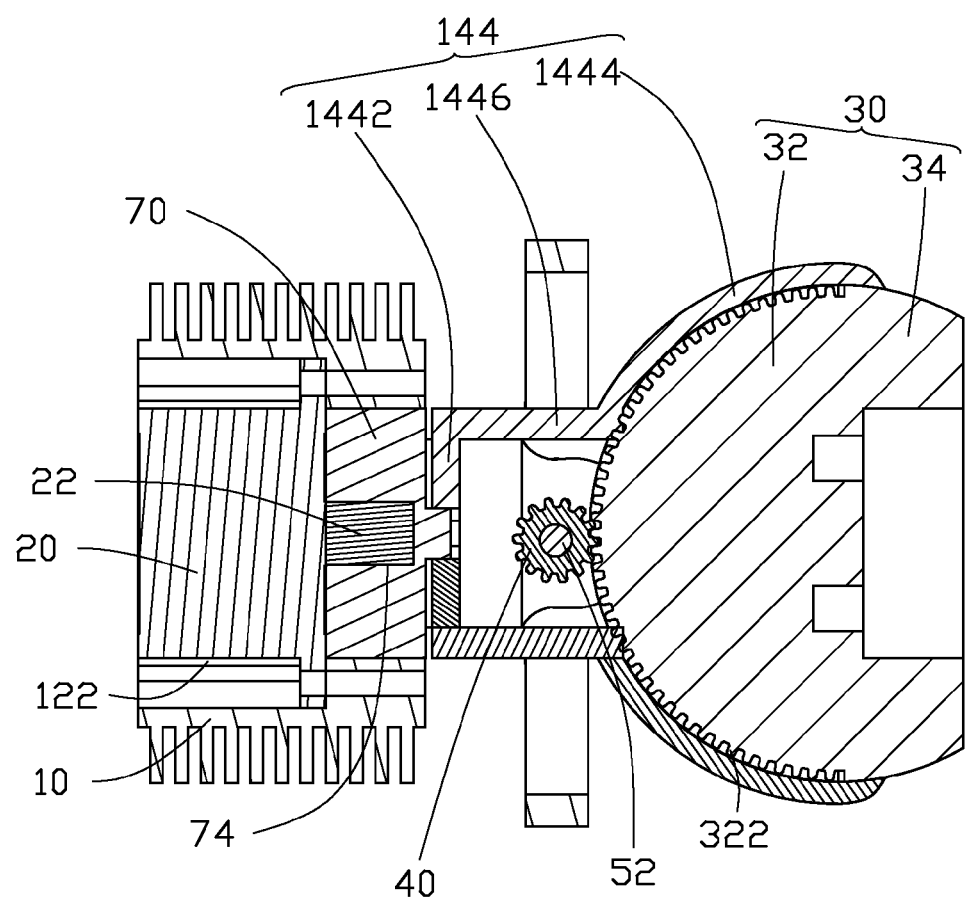
FIG. 5 is a cross-sectional view of the joint mechanism used with a robot shown in FIG. 3 along the line V-V.
Figure 6:
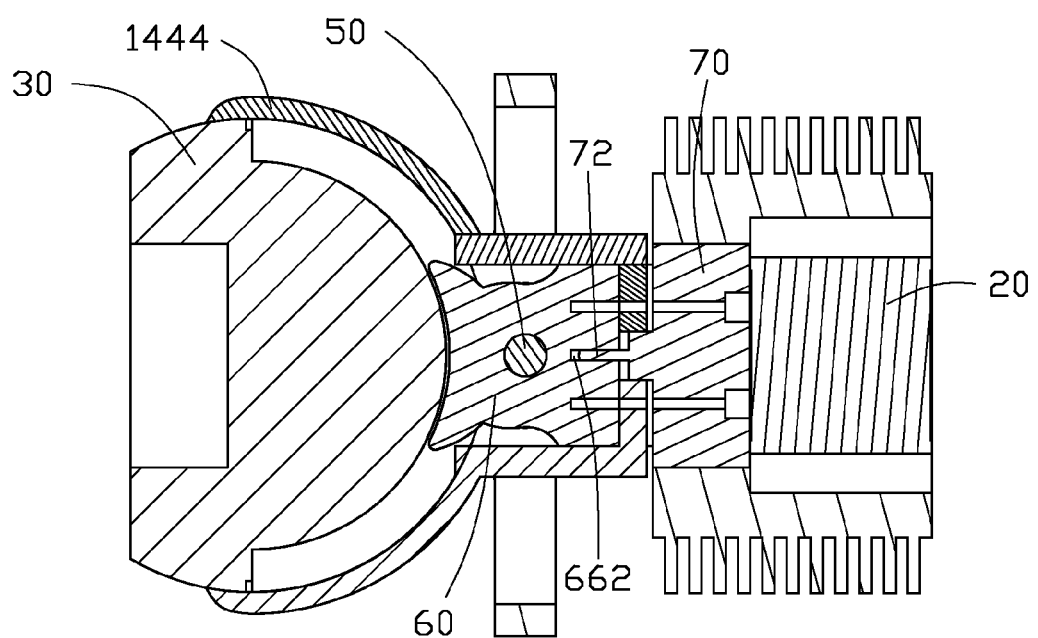
FIG. 6 is a cross-sectional view of the joint mechanism used with a robot shown in FIG. 3 along the line VI-VI.

Referring to FIGS. 3 to 5, during assembly, the first drive device 20 is mounted in the mounting hole 122. The first drive shaft 22 is retained in the shaft hole 74 so the connecting element 70 is retained on the first drive device 20. The second limiting arms 144 are retained on the base 10, by retaining the second limiting arms 144 on the connecting element 70. The gear 40 is mounted on the central portion of the second drive shaft 52. The opposite ends of the second drive shaft 52 respectively pass through the openings 62, and then each of the two ends are retained on each one of the second drive devices 50 so the second drive devices 50 can drive the second drive shaft 52 to rotate. The sliding boards 60 are respectively accommodated in the guiding grooves 324 with the gear 40 meshing with the toothed grooves 322. Referring to FIG. 6, the retaining pins 72 are retained in the retaining holes 662 so the sliding boards 60 are retained on the connecting element 70, thus assembling the joint mechanism 100.

In use, to rotate the joint body 30, the first drive device 20 starts to drive the first drive shaft 22 to rotate. The connecting element 70 is retained on the first drive shaft 22, the sliding boards 60 are retained on the connecting element 70, and the sliding boards 60 are received in the guiding grooves 324, so the joint body 30 will rotate around the first drive shaft 22 when the first drive shaft 22 is rotated. In other words, the joint body 30 will rotate around the first drive shaft 22 when the first drive device 20 is started. Thus, the robot hand rotates relative to the base 10.

To swing the joint body 30 relative to the base 10, the second drive devices 50 are started to drive the second drive shaft 52 and the gear 40 to rotate. The rotation of the gear 40 will drive the joint body 30 to swing relative to the base 10 along the guiding sections 1444 and the sliding boards 60 because the gear 40 meshes with the toothed grooves 322 of the joint body 30. Thus, the second portion of the robot swings relative to the base 10.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A joint mechanism for a robot, the joint mechanism comprising:
   a base;
   a first drive device mounted on the base and including a first drive shaft;
   a second drive device including a second drive shaft perpendicular to the first drive shaft;
   a joint body defining a plurality of toothed grooves;
   a sliding board operatively connected to the first drive shaft and the joint body, the sliding board taking the joint body to rotate in unison with the sliding board when the sliding board is driven to rotate by the first drive device;
   a gear mounted on the second drive shaft, the gear meshing with the toothed grooves thereby causing the joint body to swing with rotation of the gear when the gear is driven to rotate by the second drive device; and
   a limiting assembly for mounting the joint body on the base with the joint body rotatable and swingable when the sliding board and the gear are driven by the first and second drive devices;
   wherein when the first drive device is started, the first drive shaft is rotated to rotate the sliding board so that the joint body rotates around the first drive shaft; and
   when the second drive device is started, the second drive shaft is rotated to rotate the gear meshing with the toothed grooves so that the joint body swings relative to the base.

2. The joint mechanism of claim 1, further comprising a connecting element defining a shaft hole in one side thereof, in which the first drive shaft is retained.

3. The joint mechanism of claim 2, wherein the connecting element further comprises a retaining pin opposite to the shaft hole; the sliding board defining a retaining hole, in which the retaining pin is retained.

4. The joint mechanism of claim 3, wherein the sliding board comprises a first retaining portion and a second retaining portion, the first retaining portion retains the sliding board on the second drive device, and the second retaining portion engages with the connecting element.

5. The joint mechanism of claim 4, wherein the second retaining portion defines a retaining hole to engage with the retaining pin of the connecting element.

6. The joint mechanism of claim 1, wherein the limiting assembly comprises two opposite first limiting arms protruding from the base and two opposite second limiting arms releasably mounted on the base; and the first limiting arms and the second limiting arms cooperatively define a receiving space, in which the joint body is rotatably received.

7. The joint mechanism of claim 6, wherein each second limiting arm includes a retaining section retained on the connecting element, a connecting section protruding from a distal end of the retaining section and a guiding section protruding from a distal end of the connecting section; and the inner surface of each guiding section is a partially spherical surface.

8. The joint mechanism of claim 7, wherein the joint body includes a follower having a partially spherical surface contacting and complementary to the inner surfaces of the guiding sections.

9. The joint mechanism of claim 8, wherein the toothed grooves are defined along the partially spherical surface.

10. The joint mechanism of claim 1, wherein the joint body further comprises a guiding groove parallel to the tooth grooves, a portion of the sliding board extends into the guiding groove, and an extending direction of the guiding groove is predetermined to allow the portion of the sliding board which extends into the guiding groove to be slidable relative to the guiding groove when the joint body is driven by the second drive device.

11. A joint mechanism for a robot, the joint mechanism comprising:
    a first drive device having a first drive shaft;
    a second drive device having a second drive shaft perpendicular to the first drive shaft;
    a joint body defining an array of toothed grooves;
    a sliding board operatively connected to the first drive shaft and the joint body, the sliding board taking the joint body to rotate in unison with the sliding board when the sliding board is driven to rotate by the first drive device;
    a gear fixed on the second drive shaft, the gear engaging with the toothed grooves; and
    a base comprising a limiting assembly for rotatably mounting the joint body on the base;
    wherein the limiting assembly comprises two opposite first limiting arms protruding from the base and two opposite second limiting arms releasably mounted on the base; and the first limiting arms and the second limiting arms cooperatively define a receiving space, in which the joint body is rotatably received; each second limiting arm includes a retaining section retained on the connecting element, a connecting section protruding from a distal end of the retaining section and a guiding section protruding from a distal end of the connecting section; and the inner surface of each guiding section is a partially spherical surface.

12. The joint mechanism of claim 11, further comprising a connecting element defining a shaft hole in one side thereof, in which the first drive shaft is retained.

13. The joint mechanism of claim 12, wherein the connecting element further comprises a retaining pin opposite to the shaft hole; the sliding board defining a retaining hole, in which the retaining pin is retained.

14. The joint mechanism of claim 13, wherein the sliding board comprises a first retaining portion and a second retaining portion, the first retaining portion retains the sliding board on the second drive device, and the second retaining portion engages with the connecting element.

15. The joint mechanism of claim 14, wherein the second retaining portion defines a retaining hole to engage with the retaining pin of the connecting element.

16. The joint mechanism of claim 11, wherein the joint body includes a follower having a partially spherical surface contacting and complementary to the inner surfaces of the guiding sections.

17. The joint mechanism of claim 16, wherein the toothed grooves are defined along the partially spherical surface.

18. The joint mechanism of claim 11, wherein the joint body further comprises a guiding groove parallel to the toothed grooves, a portion of the sliding board extends into the guiding groove, and an extending direction of the guiding groove is predetermined to allow the portion of the sliding board which extends into the guiding groove to be slidable relative to the guiding groove when the joint body is driven by the second drive device.

* * * * *